Patented Aug. 30, 1927.

1,640,652

UNITED STATES PATENT OFFICE.

FERDINAND FALCO, OF HASPE, GERMANY.

PROCESS FOR THE MANUFACTURE OF PURE BARIUM CARBONATE.

No Drawing. Application filed September 8, 1926, Serial No. 134,337, and in Germany November 27, 1925.

The well known preparation of barium carbonate by passing carbon dioxide into a solution of barium sulphide yields a pretty pure barium carbonate which, nevertheless, still contains more or less sulphides, especially sulphide of barium. Those impurities are troublesome and their removal has been attempted for a long time, but with unsatisfactory results.

There is another process for purifying barium carbonate that has been carried out on a large scale in various works, which consists in roasting the barium carbonate in its finished state together with alkali hydrate or alkali carbonate. By that measure the sulphide compounds combine with the alkali and can be separated from the barium carbonate by lixiviation. The modification of that process having for its object to introduce into the precipitating tanks the above mentioned chemicals or to add them afterwards to the sludge of barium carbonate had only some real effect if the sludge containing alkali was dried and roasted at a rather high temperature. But both in the original process and its modifications it was absolutely necessary to employ a repeated lixiviation, in order to separate the sulphides of the alkalis formed.

The present process is characterized by a new and original way for making pure barium carbonate. My experiments proved that small quantities of reducing substances are adapted to convert the sulphur compounds contained in the barium carbonate into sulphides and sulphites. By the addition of a weak acid—here only carbon dioxide can come into question—the sulphide compounds reduced are decomposed and expelled as hydrogen sulphide or sulphur dioxide. It is therefore sufficient, to add to the contents of the precipitating tank reducing substances the quantity of which varies with the quantity of the sulphur-oxygen compounds to be reduced while carbon dioxide is passed into the solution at the same time, whereby barium carbonate practically free of sulphur compounds is produced.

A modification of my process consists in applying as a reducing agent such substances which decompose and volatilize at an elevated temperature, such as formaldehyde, formic acid, oxalic acid and the like. The oxalic acid has proved specially suitable for that purpose, small quantities added having produced a perfect desulphuration. The principal advantage of the use of oxalic acid consists in the fact, that it not only causes the reduction described above, but it also decomposes the sulphur compounds formed. The barium oxalate thus formed in the place of the sulphur compounds rapidly splits up at an elevated temperature into carbon monoxide and barium carbonate.

In carrying out the process several modifications become evident. Instead of adding oxalic acid into the precipitating tanks, I can add that acid in the form of a solution to the lixiviating or washing water to be used for the filtering apparatus. In such cases the products of reaction formed are at once sucked off thereby preventing a reversion of the reaction. It is also advantageous to add oxalic acid to the dried mass while it is moved on in apparatus to be finished.

In order to illustrate my invention, I may state the following example:

100 grammes of barium carbonate, containing about 50% of water are mixed with 5 c. c. of a 2% solution of oxalic acid. The mixture is dried in the usual manner, say in a drying drum and afterwards heated to a higher temperature. The barium carbonate which originally contained 98.25% of $BaCO_3$ and required about 1 c. c. of $\frac{n}{10}$ iodine solution for the oxidation of the sulphur-oxygen compounds showed after the treatment a purity of 99.6 to 99.8% $BaCO_3$.

When barium sulphide is prepared by fusing barium sulphate with carbon, the reduction is not quite a quantitative one, some of the barium sulphate being only reduced to barium sulphite or hyposulphite or some other sulphur-oxygen compounds. By the treatment of barium sulphide solution with gaseous carbon dioxide, those sulphur-oxygen compounds of barium will not be changed, but find their way into the precipitate of barium carbonate. It may be, that there exists a basic double compound of barium sulphide and barium sulphite or hyposulphite which is insoluble. At any rate, even if the barium carbonate formed by precipitation is washed with a considerable quantity of water for a long time, there will always be present some sulphur-oxygen compounds in the barium carbonate which are troublesome when using the carbonate. The removal of those sulphur-oxygen compounds is the object of the present process. The oxalic acid in that great dilution does scarcely act on the carbonate but it is surprising to note that it acts on the small amounts of sulphur-oxygen compounds according to the following equations:

$$C_2O_4H_2 + BaSO_3 = Ba(CO_2)_2 + SO_2 + H_2O$$

$$BaS + C_2O_4H_2 = Ba(CO_2)_2 + H_2S$$

The barium oxalate is converted into carbonate by heating. Barium sulphide and sulphite are thus converted into barium carbonate, and the sulphur-oxygen compounds present in the carbonate are completely removed.

By passing some carbon dioxide through the mass any sulphide present which may have escaped decomposition will be changed into carbonate.

What I claim is:—

1. A process for the manufacture of barium carbonate free of sulphur compounds consisting in adding to the barium carbonate produced by precipitating a solution of barium sulphide with carbon dioxide, volatile organic reducing agents, passing at the same time some carbon dioxide into the mass and heating the mass after previous drying to some higher temperature, whereupon the foreign impurities originating as products of decomposition from the reducing agents are separated out.

2. A process for the manufacture of barium carbonate free of sulphur compounds consisting in adding to the barium carbonate, produced by precipitating a solution of barium sulphide with carbon dioxide, volatile organic reducing agents which on drying the barium carbonate at an elevated temperature will be volatilized, so that a washing of the barium carbonate to free it from sulphur compounds is dispensed with.

3. A process for the manufacture of barium carbonate free of sulphur compounds comprising adding to the barium carbonate produced by precipitating a solution of barium sulphide with carbon dioxide, oxalic acid as a reducing agent.

In testimony whereof I affix my signature.

FERDINAND FALCO.